United States Patent [19]

Hecht-Nielsen et al.

[11] Patent Number: 4,894,658

[45] Date of Patent: Jan. 16, 1990

[54] METHOD OF DATA REDUCTION IN NON-COHERENT SIDE-LOOKING AIRBORNE RADARS

[75] Inventors: Robert Hecht-Nielsen, Del Mar, Calif.; Laird C. Taylor, Higley, Ariz.

[73] Assignee: Motorola, Inc., Schaumburg, Ill.

[21] Appl. No.: 548,732

[22] Filed: Nov. 4, 1983

[51] Int. Cl.⁴ ............................................. G01S 13/89
[52] U.S. Cl. ....................................... 342/90; 342/191
[58] Field of Search ............. 343/5 CM, 5 DP, 5 VQ, 343/7 A; 342/25, 90, 191, 195

[56] References Cited

U.S. PATENT DOCUMENTS

| | | | |
|---|---|---|---|
| 3,353,177 | 11/1967 | Wilmot | 342/90 |
| 3,680,095 | 7/1972 | Evans | 342/90 |
| 3,683,380 | 8/1972 | Cantwell, Jr. et al. | 342/90 |
| 3,831,174 | 8/1974 | King et al. | 342/90 |
| 3,940,762 | 2/1976 | Ethington et al. | 342/90 |
| 4,771,287 | 9/1988 | Mims | 342/25 |

*Primary Examiner*—T. H. Tubbesing
*Attorney, Agent, or Firm*—Frank J. Bogacz; Jonathan P. Meyer

[57] ABSTRACT

A method of data reduction in non-coherent SLAR systems enhances the usefulness of such systems in moving target environments. Digitized MT data is processed to identify and classify target footprints. At least some of the footprints are replaced by an indicator of the centroid thereof and its motion. Clutter is rejected. Other footprints are replaced with truncated versions thereof. The technique is suitable for real time application.

16 Claims, 8 Drawing Sheets

METHOD OF DATA REDUCTION IN NON-COHERENT SIDE-LOOKING AIRBORNE RADARS

FIELD OF THE INVENTION

The present invention relates, in general, to a method of data reduction in non-coherent side-looking airborne radars (SLAR). More particularly, the invention relates to a method of real time data processing of the moving target (MT) data produced by a non-coherent SLAR.

BACKGROUND OF THE INVENTION

Non-coherent, real aperture SLAR systems generally comprise a relatively long antenna mounted roughly lengthwise on an aircraft which produces a stationary (with respect to the aircraft), thin radar beam which sweeps across the area to be investigated as the aircraft traverses a known ground path. An example of such a radar system is the AN/APS-94 which is available from Motorola, Inc.

Non-coherent SLAR systems typically produce both a ground map (fixed target) and moving target images of the area surveyed by the radar. The present invention deals primarily with the moving target imagery. Typically, the moving target data is substantially separated from the raw radar video by means of a zero-Doppler bald-reject filter. This results in a high resolution two-dimensional (range and cross-range) image displaying the locations of moving targets.

Because of the extremely high data rates involved in gathering such image data, SLAR systems have been limited to optical data storage and retrieval techniques. This requires analog image processing and/or human image interpretation at some time after the data is recorded, usually after the aircraft has landed. Therefore, SLAR systems have not been useful for real time, moving target applications.

SUMMARY OF THE INVENTION

Accordingly, it is an object of the present invention to provide an improved method of data reduction in non-coherent SLAR systems.

It is a further object of the present invention to provide a method of real time data reduction for use in processing the MT data produced by a non-coherent SLAR.

Yet a further object of the present invention is to provide a method of moving target centroid location and target classification implementable in real time in a non-coherent SLAR system.

A particular embodiment of the present invention comprises a method of data reduction of the MT data produced by a non-coherent SLAR system which is capable of reducing the video bandwidth typical of SLAR MT data to an audio bandwidth. The raw SLAR video, which has been range integrated into 30 meter-wide bins in the standard AN/APS-94 system, is first filtered to substantially separate the MT data. This data is then azimuth integrated to separate the data into azimuth lanes approximately 30 meters wide. The data is thresholded to provide a one bit digital word corresponding to each of the range-azimuth cells. The resulting digitized MT data is then corrected from slant range to ground range and for the crab angle of the aircraft. The resulting digitized, rectified MT data is then subjected to the operation of an algorithm which utilizes only the two most recently completed track lanes of data to identify potential targets, to classify the targets according to the length and motion thereof, to reject clutter, to replace the digitized data corresponding to at least some of the valid targets with indicators of the centroid of the target and the motion thereof, and to replace the digitized data corresponding to the remainder of the valid targets with substantially truncated versions thereof. The resulting MT image is suitable for display in essentially real time in the SLAR aircraft. It is also suitable for narrow band and/or secure communication from the aircraft to other locations for further processing, interpretation or storage.

These and other objects and advantages of the present invention will be apparent to one skilled in the art from the detailed description of the invention below taken together with the drawings.

DETAILED DESCRIPTION OF THE INVENTION

Figure 1:
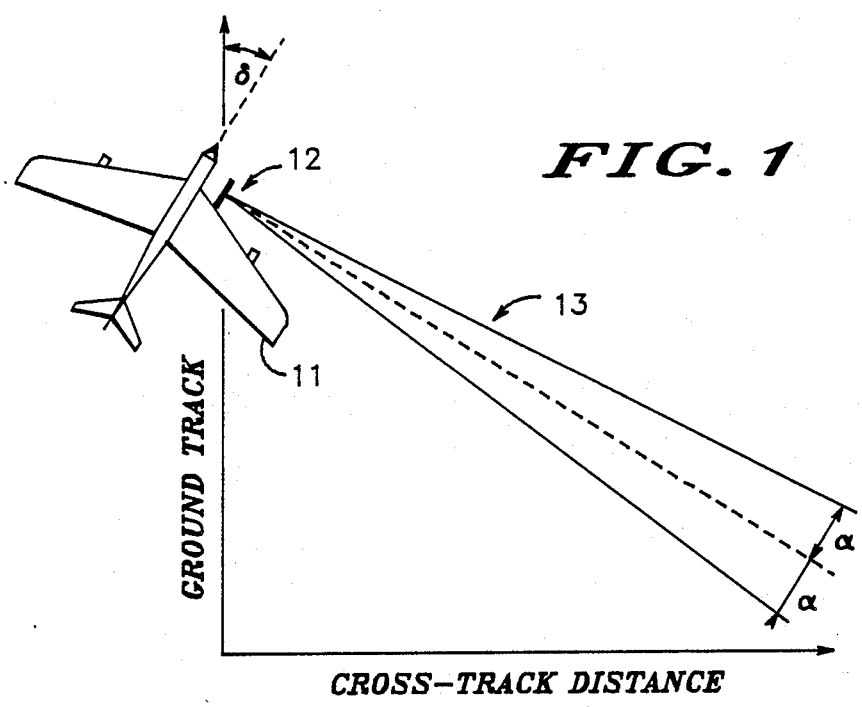
FIG. 1 is a graphic representation in plan view of a typical SLAR aircraft geometry.

Referring now to FIG. 1, an aircraft 11 carrying a real aperture type SLAR system traverses a known ground track. In general, because of cross-winds, aircraft 11 flies at a heading which differs from the ground track by a crab angle δ. Navigation systems aboard aircraft 11 are capable of supplying the required information about the ground track and the crab angle δ to the SLAR system.

Real aperture type SLAR systems are distinguished from synthetic aperture type SLAR systems in that the former utilize a relatively long antenna 12 to produce a relatively narrow radar beam 13 which has an angular half-width α and is directed perpendicular to the long axis of antenna 12 while the latter utilize a relatively short antenna and high resolution Doppler filtering techniques to simulate an extremely narrow radar beam. An example of a real aperture type SLAR system is the AN/APS-94 which is available from Motorola, Inc.

Antenna 12, which is shown here separated from aircraft 11 for clarity only, is normally mounted parallel to the long axis of aircraft 11 and has a length of two meters or more. The angular half-width $\alpha$ of radar beam 13 is generally less than one degree. As aircraft 11 traverses the ground track the SLAR system, through antenna 12, emits a series of radar pulses at a pulse repetition rate of roughly 700–800 pulses per second. During the time between the pulses, antenna 12 receives analog pulse return data from various fixed and moving targets which were illuminated by the previous pulse. This raw analog pulse return data is separated into moving target (MT) and fixed target (FT) channels by means of a zero-Doppler band-reject filter. In other words, pulse return data which arrives at antenna 12 with a frequency other than the frequency at which the SLAR system emits pulses is identified as data from a moving target and is passed to the MT channel. It is common to design the Doppler filter so that FT data bleeds through into the MT channel in an attenuated state to provide an aid in subsequent image interpretation. In general, real aperture type SLAR systems may emit radar beams concurrently on both sides of the carrying aircraft instead of only one side as is shown in FIG. 1. The discussion throughout will refer to a single-sided, real aperture type SLAR system, but the extension to a double-sided system is familiar.

Figure 2:
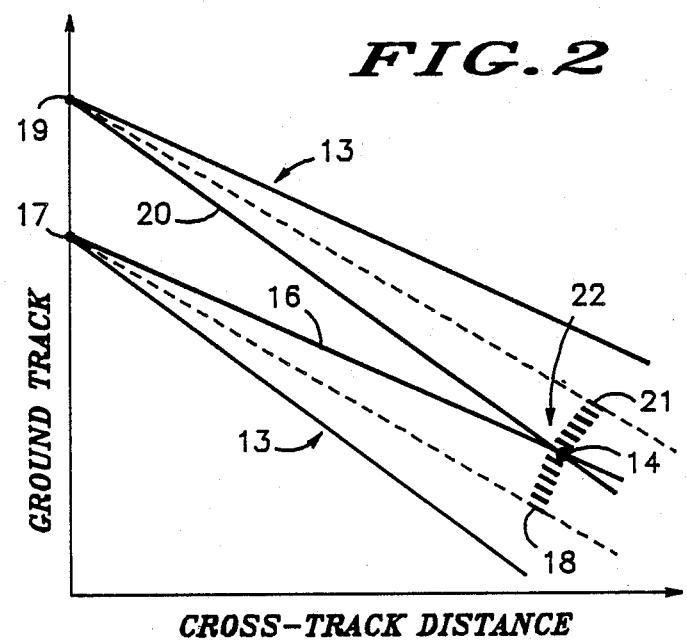
FIG. 2 is a graphic representation in plan view of the uncorrected analog pulse return data from a moving target.

Referring now to FIG. 2, the form of the analog pulse return data from a moving target is described in detail. A moving target 14, which is assumed here to move only slightly during the time it is illuminated by the SLAR system, first appears in the MT channel when the leading edge 16 of beam 13 just touches target 14. At this time, the SLAR system is located at position 17 along the ground track. Since all pulse return data is assumed by the system to correspond to a target lying on the center line of beam 13, the first pulse return datum 18 from target 14 is recorded by the SLAR system as appearing on the center line of beam 13 at a distance corresponding to the slant range between position 17 and target 14. The relationship between the slant range, the ground range and the cross-track distance of target 14 is described below. As the SLAR aircraft proceeds along the ground track, each succeeding radar pulse will illuminate target 14 and result in the entry of analog pulse return data into the MT channel of the system. When the SLAR system reaches position 19 along the ground track the trailing edge 20 of beam 13 intersects moving target 14, resulting in a final pulse return datum in the MT channel of the SLAR system. The collection of all of the pulse return data from moving target 14 is known as the target footprint 22. As is well-known, there may be gaps in footprint 22 resulting from failure of the energy reflected from a particular radar pulse to reach the SLAR system in recognizable form. This problem is discussed below.

Figure 3:
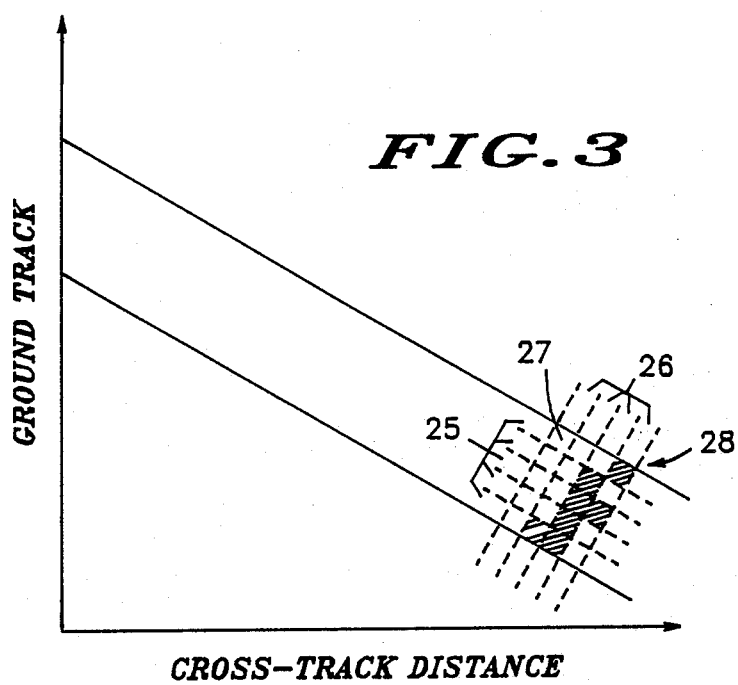
FIG. 3 is a graphic representation in plan view of the uncorrected, digitized MT data corresponding to the target of FIG. 2.

Referring now to FIG. 3, the conversion of the analog pulse return data forming footprint 22 into digital form is discussed. Three processing steps are required to form this conversion: azimuth integration, range integration and thresholding. The standard AN/APS-94 receiver provides raw video data which has been range integrated into 30 meter-wide, or 200 ns duration, bins 26. Azimuth integration involves the aggregation of the data in the MT channel into azimuth lanes 25 by integrating the analog pulse return data from a number of successive radar pulses. Each azimuth lane 25 extends from the minimum range to the maximum range of the SLAR system. An OV-1D Mohawk aircraft, a typical SLAR aircraft, flies a radar reconnaissance mission at an approximate speed of 90 meters per second, or 180 knots, so the aircraft travels 30 meters in about $\frac{1}{3}$ of a second. In this time, the radar may emit 250–275 pulses, the returns from which are additively combined (integrated) to form a single data record of the last 30 meters' combined radar returns. The 30 meter wide stripe of countryside to which this record corresponds is an azimuth lane 25.

As is apparent from FIG. 3, once the pulse return data has been range integrated and azimuth integrated, it is broken into a plurality of approximately square data cells 27 each corresponding to a particular 30 meter square area in the radar beam. The data is then converted to digital form by assigning a one bit digital word to each data cell 27. This is accomplished by comparing the amount of pulse return energy corresponding to each cell 27 to a threshold value and assigning a value of one to each cell 27 in which the amount of pulse return energy exceeds the threshold. All other cells 27 are assigned a value of zero.

Since the purpose of the present invention is to process only moving target data the threshold value must be chosen to eliminate the fixed target data which has been allowed to bleed through into the MT channel. The majority of the pulse return data is from fixed targets, so an appropriate threshold may be chosen by examining a histogram of cell brightness for a typical SLAR image. In other words, typical SLAR images are divided into data cells 27 and a histogram is formed of the distribution of cell brightness data in the image. The majority of data cells 27 contain either no pulse return data or attenuated fixed target data which has been allowed to bleed through. Therefore, the histogram shows a marked peak in the distribution at low brightness values corresponding to the absence of moving target data. A threshold is easily chosen to eliminate those data cells appearing in the distribution peak.

It is anticipated that the setting of the threshold for digitizing the data will be performed automatically and adaptively according to an algorithm to be developed. Alternately, the threshold may be under the control of an operator aboard the carrying aircraft.

The shaded data cells 27 of FIG. 3 comprise the digitized footprint 28 of the target. The shape of footprint 28 is undoubtedly somewhat distorted with respect to the corresponding footprint in analog form due to severe rounding errors involved in using only one bit to represent each data cell 27. As faster data processing hardware becomes available to meet the requirements of an airborne radar, the number of bits used to represent each data cell 27 will certainly increase.

As is apparent from FIG. 3, azimuth lanes 25 and range lanes 26 are not properly oriented to allow convenient data processing in the preferred frame of reference, which is formed by the ground track and the cross-track distance axes.

Figure 4:
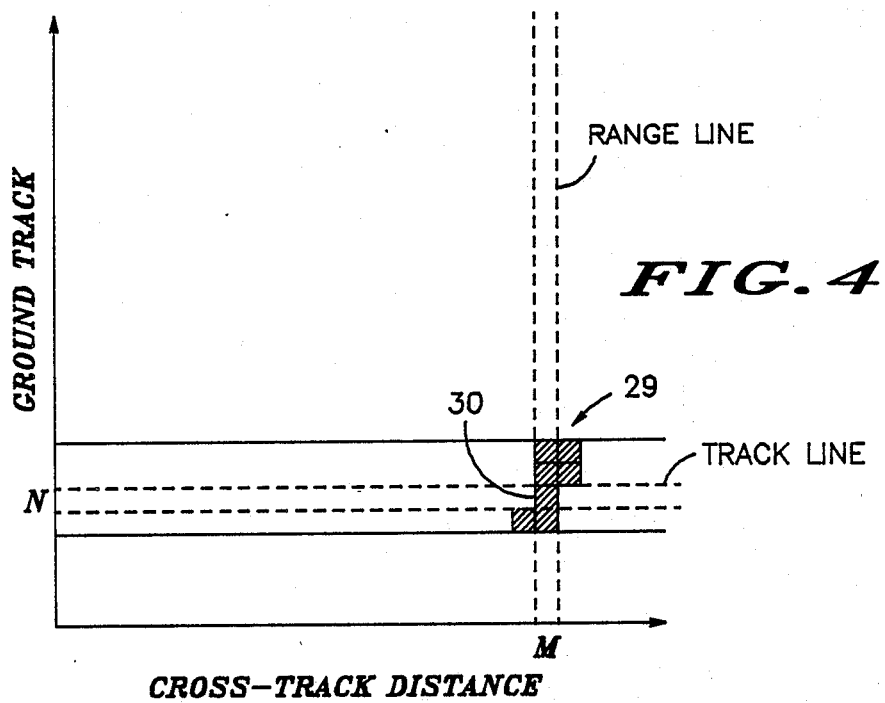
FIG. 4 is a graphic representation in plan view of the rectified, digitized MT data corresponding to FIG. 3.

Referring now to FIG. 4, the digitized MT data has been corrected, or rectified, to place target footprint 29 nearly in the form in which it would have appeared had crab angle $\delta$ been equal to zero. This rectified image is the preferred form of SLAR data and will be referred to hereinafter as the H-image. The corrections necessary to rectify the digitized MT data from the form of FIG. 3 to that of FIG. 4 will be described with reference to FIGS. 5 and 6, below. The H-image is divided into a plurality of data cells 30 each having a one bit digital word representing the presence or absence of moving target data in that cell. Each data cell 30 is at the intersection of a range lane and a track lane. The range lanes, which are approximately 30 meters wide, run parallel to the ground track of the aircraft and are indexed by the letter M. The track lanes, which are also approximately 30 meters wide, run perpendicular to the ground track of the aircraft and parallel to the cross-track distance axis and are indexed by the letter N. Therefore, data cell (M,N) is the cell at the intersection of track lane N and range lane M. The variable N is set to zero when the SLAR is turned on and increments every 30 meters of travel along the ground track until the SLAR is turned off. The variable M, on the other hand, extends from zero to a value corresponding to the maximum range of the radar throughout the mission. A conservative maximum range value for M is about 5,000, while N may reach a value of 20,000–40,000 depending on the mission and the aircraft's endurance.

Figure 5:
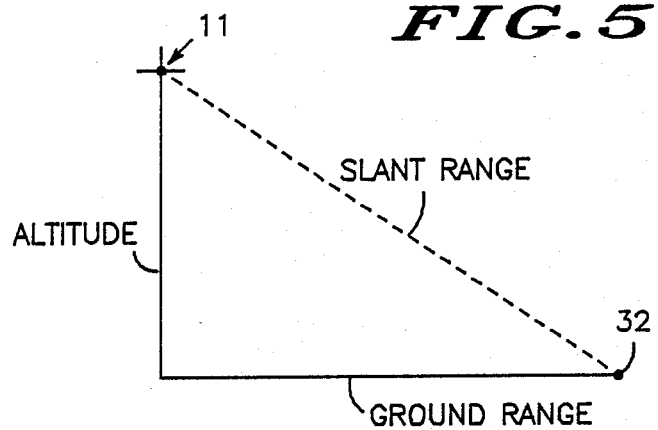
FIG. 5 is a graphic representation of the relationship between slant range and ground range.

Referring now to FIG. 5, one of the corrections to be applied to the uncorrected, digitized MT data of FIG. 3 in order to produce the H-image of FIG. 4 is described. One of the indicators of the true target location which is measurable by the SLAR system is the slant range. As shown in FIG. 5, the slant range is the distance along the path traveled by the radar energy as it propagates between aircraft 11 and target 32. Since aircraft 11 flies at some finite altitude, the slant range is different from the distance between target 32 and the present position of aircraft 11 on the ground track. This distance is referred to as the ground range and, as will be apparent below, is different from the cross-track distance. The conversion from slant range to ground range is trivial. The ground range is equal to the square root of the difference between the square of the slant range and the square of the altitude. Since navigation systems aboard aircraft 11 can readily measure the altitude, this conversion is easily performed.

Figure 6:
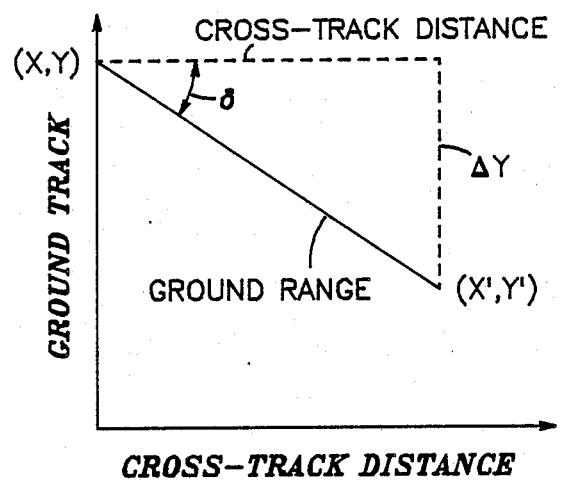
FIG. 6 is a graphic representation of the crab angle correction applied to the MT data by the present invention.

Referring now to FIG. 6, the second correction to be applied to the data of FIG. 3 to produce the H-image is described. The SLAR aircraft is continuously recording its current position (X,Y) along the ground track and its crab angle δ. The SLAR system is continuously calculating the ground range between that current position of the aircraft and a location (X',Y') which is currently under investigation. From these known quantities, the SLAR system must calculate the offsets from the measured position of the aircraft (X,Y) which are necessary to place the received data in the proper position (X',Y') in the H-image. As is apparent from FIG. 6, these offsets are easily calculated trigonometric functions. The cross-track distance, which is the range which would have been measured had the crab angle been zero, is simply the ground range multiplied by the cosine of the crab angle. The other offset ΔY is the ground range multiplied by the sine of the crab angle. When the correction functions described with reference to FIGS. 5 and 6 are applied to each data cell in the image of FIG. 3, the H-image is obtained. A residual radial velocity error remains to be compensated for as will be described below. The data processing steps required to render the raw analog pulse return data into the H-image are simple enough to be performed in real time. In other words, as each azimuth lane is completed and digitized, the data therein can be immediately transferred to the H-image. The remainder of the data reduction technique described below is essentially a method for distilling information about targets from their footprints in the H-image and representing that information in more compact form.

As will be apparent to one skilled in the art, the data processing necessary to obtain the H-image need not be performed in the order specified above. In other words, it may be advantageous to rectify the range-gated analog video prior to integrating and digitizing. These choices depend on the hardware environment of the particular system and must be left to the individual designer.

The central purpose of the remainder of the data processing technique of the present invention is to locate the centroids of moving targets and to replace the target footprint appearing in the H-image of each of those targets with a single point corresponding to the centroid. In addition, the individual targets are classified as either moving toward the ground track of the SLAR aircraft, moving away from the ground track of the aircraft or moving only slowly. An indication of this classification is appended to the point representing the centroid of the target. In identifying individual targets for which centroids may be located, the data processing technique locates some targets whose footprints are too short to represent real moving targets and rejects these targets as clutter, thus removing their footprints from the H-image altogether. Further, some targets are identified with footprints too large to be reasonably termed individual targets. These targets are classified as extended targets and have their footprints replaced with substantially truncated versions thereof.

The output of the data processing structure is a new image called the G-image which is also made up of a plurality of data cells referenced by the range lane index M and the track lane index N. Each data cell contains a three bit digital word and therefore has eight possible values. At present, only five of these values are used. A value of 000 corresponds to the absence of moving target data in the data cell. A value of 100 corresponds to the presence of the centroid of a slowly moving target. A value of 010 corresponds to the presence of the centroid of an approaching target. A value of 110 corresponds to the presence of the centroid of a receding target. A value of 001 corresponds to the presence of an element of an extended target. As is apparent, the G-image which results from applying the data reduction technique taught herein to the raw pulse return data is emminently suitable for digital storage aboard the SLAR aircraft, automatic manipulation and display on board the aircraft and narrow band communication to other locations. Thus, a type of radar which has been useful primarily for terrain mapping purposes is converted to an efficient moving target radar.

Referring now to Table I, the variable names used in the flow chart description of the data processing method below are presented in tabular form. It should be noted that the variable names and the flow chart description below are consistent with a version of the data processing algorithm which is embodied in standard Fortran code. While this code is the present best embodiment of the invention, it is anticipated that future radar systems embodying the present invention will utilize either standard microprocessors executing assembly language, specialized processors including firmware and hard wired instructions, or some combination of the above. The variable names are divided into three groups: input, internal, and output. The input variables include the array containing the H-image and several variables containing various parameters which govern the operation of the algorithm. The internal variables are those used by the algorithm to keep track of various quantities needed to calculate the centroids and radial velocities of the target footprints and to perform other functions. The output variables include those indicating the positions of the centroids of the target footprints and the radial velocities thereof.

The digital data words comprising the H-image are passed to the data processing apparatus from the front end apparatus which produces the H-image from the raw pulse return data in a two-dimensional array H. The first array index M references the individual range bins containing the digital data words. The second array index, which is equal to one or two, indicates which of two track lanes of the H-image are being referenced. In other words, H(M,1) contains one track lane of the H-image and H(M,2) contains an adjacent track lane of the H-image. The preferred embodiment of the present invention uses only two track lanes of the H-image at any one time to perform its calculations. This allows the apparatus to run in real time. However, it is also possible to utilize more than two track lanes of the H-image in order to improve the recognition of fragmented target footprints if the increased data processing overhead is tolerable.

Two parameters used to classify target footprints according to their lengths are passed to the data processing apparatus with the variables L1 and L2. L1 is used as a lower limit on footprint length below which the footprints are rejected as spike clutter. While satisfactory performance has been achieved with a constant value of L1, it is apparent that, since the minimum expected footprint length increases with increasing range, superior performance may be achieved if L1 is an array indexed by the range index M. Specifically, the expected footprint length $L_{exp}$ for an individual target in range lane M where the range lanes have a width d is:

$$L_{exp} = \frac{\sin 2\alpha}{\cos(\alpha - \delta)\cos(\delta + \alpha)} \cdot d \cdot M \quad (1)$$

Similarly, L2, which is used as an upper length limit of individual target footprints, renders satisfactory performance as a scalar variable but may offer improved performance as an array indexed by M. L2 is used to distinguish between the footprints of individual targets and the footprints of groups of targets which are so close to one another as to merge into a single, extended footprint. The optimum values of L1 and L2 are best determined empirically with reference to equation (1). The present embodiment of the present invention requires that the operator of a radar display supply the values for L1 and L2.

The next two input variables, N1 and N2, are used by the data processing apparatus to recognize target footprints which skip one or more track lanes or range lanes, respectively. N1 and N2 are similar to L1 and L2 in that satisfactory performance is achievable with single values but improved performance may be achieved with range-indexed arrays. This is particularly true of N1, which is used by the apparatus to recognize fragmented target footprints. Such footprints occur at long range because of the way the MT processor in the AN-/APS-94 operates. In such a processor, the IF signal component which produces the MT footprints arises from the product of the MT Doppler signal and the radar's clutter return. In effect, the clutter is used as the reference signal for the MT detection. At long ranges the clutter amplitude may be too low to provide this reference reliably, so the MT signal can become intermittent. Again, the optimum value for N1 is highly dependent upon the individual radar system and is best determined empirically. N2 is used by the apparatus to set the width of a range window which is used to recognize a target footprint which ends in one range lane but picks up at a different range in the next track lane. Both N1 and N2 may be advantageously supplied by the display operator.

The next input variable, RO, is a scalar variable which is used to pass a value of the apparent radial velocity of target footprints which is caused by the aircraft crab angle to the data processing apparatus so that this apparent radial velocity may be subtracted from the radial velocities calculated by the algorithm. The value of RO may be calculated as:

$$RO = \sec \alpha \sin \delta \cos \delta. \quad (2)$$

Finally, two more scalar input variables, RLMIN and RLMAX are used to indicate the minimum and maximum values, respectively, of the range index M.

Next, the group of internal variables used by the data processing apparatus to perform its various calculations are described. First, a two-dimensional array F, which has a structure identical to the H array, is used to implement the fragmented target search described with reference to N1 above. In effect, the F array contains the same data as the H array except that "tails" have been added to each of the target footprints so that fragmented footprints merge. The details of this function will be apparent from the description of FIG. 7 below. A second two-dimensional array L having the same structure as the F and H arrays is used to accumulate the current length, in number of track lanes occupied, of each target footprint. Similarly, a two-dimensional array Q is used to accumulate a first footprint moment for each target footprint and a two-dimensional array Q1 is used to accumulate a second footprint moment. The details of the calculation and use of the Q and Q1 arrays will be described below.

Next, a one-dimensional array WGT, which is indexed by an arbitrary index I, contains a weighting function which has a maximum value at I=0 and which decreases monotonically to a minimum value of zero when I=N2 and when I=−N2. Obviously, the structure of the WGT array will be somewhat more complicated if N2 is a function of range. In addition, weighting functions with shapes different from the one described may be used. The next two internal variables are the scalars Z and W which are used as the second indices for the H, F, L, Q and Q1 arrays. Z and W are used to implement a "software ping-pong" memory management scheme. Z and W are always equal to one or two and are never equal to each other. The details of this memory management scheme will be more apparent from the description of FIGS. 7 and 8 below. A scalar variable TKLANE is used to keep track of the current track lane being processed. Finally, a set of scalar variables A, A1, B, C, D, D1, E, and E1 are used as intermediate products in the various calculations performed by the data processing apparatus.

A group of three output variables is used to pass the reduced data concerning the targets from the data processing apparatus to display, storage, transmission or other utilization apparatus. A scalar variable M5 is used to represent the range lane of the centroid of each target detected. A second scalar variable N5 is used to contain the track lane of the centroid of each target detected. Finally, a scalar variable V5 is used to contain the velocity category of each target detected. In the preferred embodiment, the variables M5, N5 and V5 are packed into a single digital data word before being passed out of the data processing apparatus.

TABLE I

| GROUP | VARIABLE NAME | TYPE | DESCRIPTION |
|---|---|---|---|
| Input | H(M,1); H(M,2) | 2-D Array | Two track lanes of H-image |
| | L1[L1(M)] | Scalar [Array] | Lower length limit of footprints |
| | L2[L2(M)] | Scalar [Array] | Upper length limit of individual target footprints |
| | N1[N1(M)] | Scaler [Array] | Upper limit on track lanes skipped |
| | N2[N2(M)] | Scalar [Array] | Extent of range window |
| | RO | Scalar | Apparent radial velocity due to crab |
| | RLMIN | Scalar | Minimum range index value |
| | RLMAX | Scalar | Maximum range index value |
| Internal | F(M,1); F(M,2) | 2-D Array | Two track lanes of augmented H-image |
| | L(M,1); L(M,2) | 2-D Array | Current and previous accumulated length |
| | Q(M,1); Q(M,2) | 2-D Array | Current and previous accumulated 1st moment |
| | Q1(M,1); Q1(M,2) | 2-D Array | Current and previous accumulated 2nd moment |
| | WGT(I) | 1-D Array | Weighting Function |
| | Z and W | Scalars | Ping-Pong array indices |
| | TKLANE | Scalar | Index of current track lane |
| | A, A1, B, C, D, D1, E, E1 | Scalers | Intermediate products |
| Output | M5 | Scalar | Range lane of centroid |
| | N5 | Scalar | Track lane of centroid |
| | V5 | Scalar | Velocity category of target |

Figure 7:
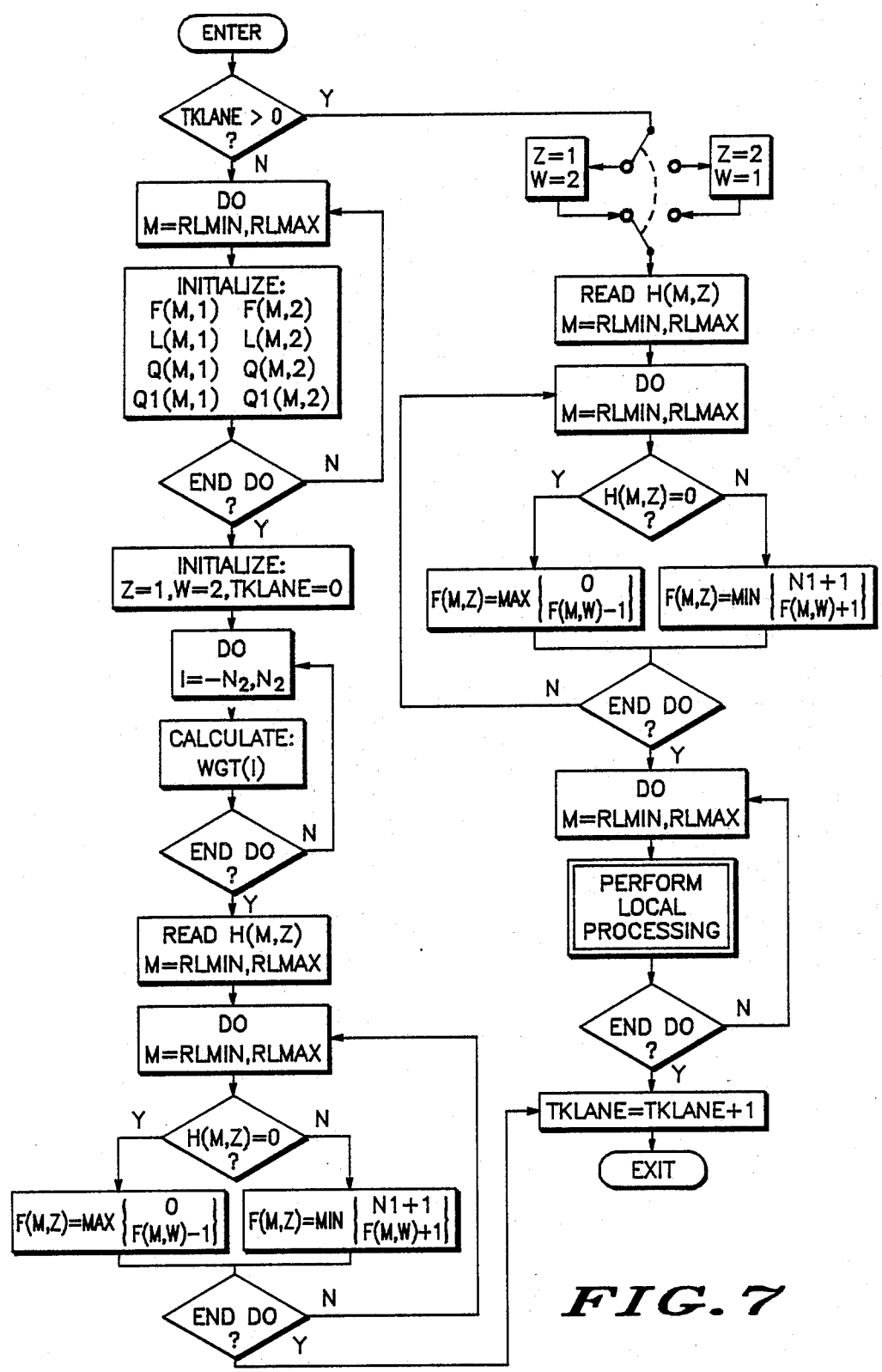
FIG. 7 is a flow chart describing the method of data reduction applied to rectified, digitized MT data according to the principles of the present invention.
Figure 8:
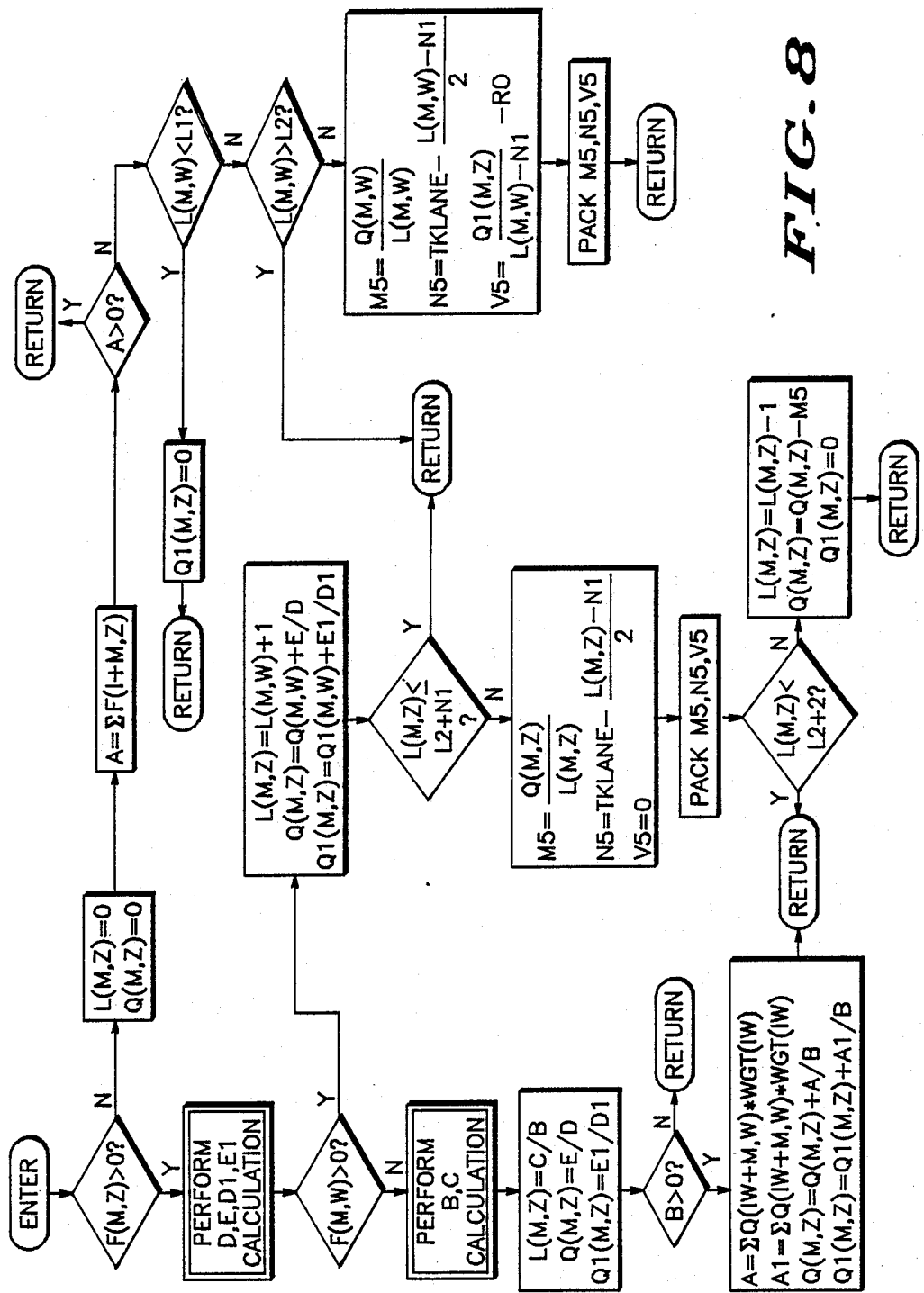
FIG. 8 is a flow chart describing a portion of the method of data reduction according to the principles of the present invention.

The flow charts of FIGS. 7 and 8 describe the operation of a data processing apparatus according to the principles of the present invention for reducing the H-image. The apparatus is intended to be invoked each time the front end apparatus produces a new track lane of the H-image. It is assumed that the executive routine which calls the apparatus of FIGS. 7 and 8 has obtained the values of L1, L2, N1, N2 and RO to be applied to the current track lane together with any other required parameters. Throughout the following discussion, those variables which may be scalars or arrays are assumed to be scalars and the modifications required for the use of arrays are apparent.

Starting with the portion of the apparatus described in FIG. 7, the first step after entering the apparatus is to test the variable TKLANE for a non-zero value. If the value is non-zero it means that the apparatus has been called previously and the initialization routine may be skipped. On the other hand, if this is the first call of the apparatus the value of TKLANE will not be greater than zero and the initialization routine must be carried out. Following the negative branch of the initial test, a loop controlled by the value of the range index M, which increments from RLMIN to RLMAX, sets the value of each of the individual memory locations in the F, L, Q and Q1 arrays equal to zero. After completion of the initialization loop the variable TKLANE is initialized to zero and the ping-pong array indices Z and W are initialized to 1 and 2, respectively.

Next, a loop controlled by the value of an index I, which has values from $-N2$ to $+N2$, is used to calculate the weighting function variable WGT(1). The formula chosen to calculate WGT(1) depends on the desired characteristics of the weighting function.

Since the data processing apparatus requires two track lanes of the H-image for processing, the initialization routine includes the reading of the first available track lane of H-image data into the H array. The data is read sequentially into the array as the range index M increments from RLMIN to RLMAX. The second index of the H array is Z. As will be more readily understood from the description below, each new track lane of H-image data is read into the H array using Z as the second index. Prior to reading in each track lane of H-image data, the values of Z and W are swapped. Therefore, H(M,Z) always contains the most current track lane of H-image data, and H(M,W) always contains the next previous track lane of H-image data.

Next, a first pass through the data which has just been read in is executed by means of a loop controlled by the value of the range index M as it increments from RLMIN to RLMAX. On each pass through the loop the value of H(M,Z) is compared to zero. If it is equal to zero, in other words if there is no MT energy present in that data cell, then the value of F(M,Z) is decremented by one from its value in the previous track lane, F(M,W). The value of F(M,Z) is not allowed to become negative. If H(M,Z) is not equal to zero, in other words if there is MT energy in the data cell, then the value of F(M,Z) is incremented one from its value in the previous track lane, F(M,W). The value of F(M,Z) is not allowed to exceed $N1+1$. As an option, it is possible to set a minimum value of two for F(M,Z) in the negative branch of this test in order to improve algorithm performance at the leading edge of target footprints. The purpose of the F array, as stated before, is to allow the algorithm to recognize as a single target footprint fragments which are separated by one or more, but less than N1, track lanes. In essence, the F array contains an augmented H-image which has tails of maximum length N1 appended to the trailing edges of all target footprints, whereby fragments separated by less than N1 track lanes will merge. Once this initial pass through the first track lane of the H-image has been completed, the track lane index TKLANE is incremented by one and the algorithm is exited.

On subsequent calls of the apparatus the result of initial test for a positive value of TKLANE will always be affirmative and process control will be passed to the second branch of the apparatus. First, the values of Z and W are toggled so that the new H-image data will be read in over the oldest H-image data. Next, the newly available track lane of H-image data is read into the H array and then a first pass through the data to calculate the proper values for F(M,Z) is performed. These steps are identical to the ones described with reference to the initialization routine. When the first, pass through the current track lane of the H-image is complete a second pass is made to perform the local processing. A loop controlled by the value of the range index M, which increments from RLMIN to RLMAX, is executed with a call to the local processing routine for each value of M. The local processing routine is described with reference to FIG. 8. When the loop calling the local processing routine is finished, the track lane index TKLANE is incremented by one and the algorithm is exited.

Referring now to FIG. 8, the local processing routine of the apparatus according to the principles of the present invention is described. The purpose of the local processing routine is to identify and characterize the various target footprints appearing in the H-image and to return the digital data words which comprise the G-image.

The first step in the local processing routine is to test for non-zero values of F(M,Z). Since the H-image is composed of only MT data most of the data cells will be empty; that is, they will have a value of zero. Likewise, most of the cells in the F array will be equal to zero. Therefore, the result of the initial test in the local processing routine will be predominately negative. This result indicates that: (1) no valid target footprint is present; (2) an augmented target footprint has ended in the previous track and it must be classified and processed; or (3) an augmented target footprint has shifted from the M range lane to another near by range lane. In any case, the values in L(M,Z) and Q(M,Z) are no longer needed and are set equal zero. The details of the calculation of the L, Q and Q1 arrays are described below. Next, an intermediate product A is calculated to distinguish case (3) from the other two. As is the case with all of the summations in the local processing routine, the range of the summation used to calculated A is from $-N2$ to $+N2$. In other words, A is equal to the sum of all of the values of F(M,Z) for all values of M in the range window defined by N2.

If A is non-zero, then case (3) above is true and the target footprint should not be deemed to have ended. Therefore, if the test for non-zero values of A which follows the calculation of A is affirmative, the local processing routine is terminated and process control is returned the calling loop in FIG. 7.

If the test for positive values of A is negative, then either case (1) or case (2) is true. To distinguish these two cases the value of the accumulated target footprint length which appeared in the previous track lane, that is L(M,W), is compared to the lower limit on acceptable target footprint lengths, L1. If the result of this test is positive, indicating that either no footprint was present in the previous track lane or that a footprint too short to represent a real target was present, then the value of Q1(M,Z) is set to zero and the local processing routine is terminated, returning program control to the calling loop of FIG. 7. Since this is the path most commonly followed by the local processing routine, it is chosen to be as short as possible to decrease run time.

If the result of the test is negative, indicating that a valid target footprint ended in the previous track lane, then the footprint must be classified and processed. The value of L(M,W) is compared to the upper limit on the length of individual target footprints, L2. If the result of the test in affirmative, indicating that the footprint which just ended was one of an extended target, then the local processing routine is terminated and process control is returned to the calling loop of FIG. 7. This is because the information passed to the G image corresponding to extended targets is calculated elsewhere in the local processing routine. Only the footprints of individual targets are processed after the footprint has ended.

Therefore, if the value of the test is negative, then the output variables M5, N5 and V5 are calculated. M5, which is the range lane of the target centroid, is simply the first moment of the footprint, Q(M,W), divided by the footprint length, L(M,W). N5, which is the track lane of the footprint centroid, is equal to the value of TKLANE minus half of the difference between L(M,W) and N1. The reason that N1 is subtracted from the footprint length is that the length appearing in the L array is the augmented length, which is greater than the true length. V5, which is the velocity category of the target, is the second target moment, Q1(M,Z), divided by the difference between the accumulated footprint lengths and N1 minus the apparent radial velocity caused by the crab angle RO. In practice, the value of V5 is not actually transmitted to the G-image. Instead, it is used to set two digits in the digital word placed in the G-image at the location indicated by M5 and N5 to indicate one of a slowly moving target, a target moving towards the ground track or target moving away from the ground track. In essence, the velocity of the target is measured by the local processing routine by calculating the slope of the footprint; that is, the number of range lanes crossed divided by the number of track lanes crossed. This is a relatively crude means of estimating target velocity and does not justify a more detailed description of the velocity in the G-image. It is anticipated however, that future processors on real aperture type SLAR's will have the capability of measuring the radial velocity of moving targets directly from their Doppler shifts. This will obviate the need for the calculation of V5 in the local processing routine and would justify the addition of more detailed information concerning target velocity to the G-image.

Once the values of N5, M5 and V5 have been calculated, they are packed into a single digital word to be added to the G-image and the local processing routine is terminated. The specifics of how the information is configured in the G-image are subject to wide variation and are particularly dependent on the hardware chosen for display purposes.

Returning to the upper left corner of FIG. 8, the case of a non-zero value of F(M,Z) is described. Such a positive value indicates that the apparatus is in the middle or at the begining of a target footprint, thus requiring additions to the cumulative internal variables L, Q and Q1. First, several intermediate product variables D, D1, E, E1, must be calculated. For purposes of clarity the details of the calculation of D, E, D1 and E1 are omitted from FIG. 8 and are described below with reference to FIG. 9. The routine for calculating these intermediate products looks at each of the data cells in the current track lane within the range window about M defined by N2. For each data cell associated with a non-zero value in the F array the routine adds some value to each of the intermediate products. D is the sum of the weighting coefficients associated with positive values in the F array. E is the weighted sum of the range cell values which are associated with non-zero values in the F array. Thus, the quotient E/B is a weighted average range cell value. D1 and E1 are doubly indexed summations which are analogous to D and E respectively. This will be more easily understood from the discussion of FIG. 9 below.

Next, the value of F(M,W), that is, the value of the F array in the current range lane M and the previous track lane W, is tested for non-zero values. If the result of the test is negative then the positive value of the F array in the current track lane Z must be either the beginning of a new target footprint or a portion of a target footprint which has moved into a new range lane. Thus, the negative branch of this test involves either the calculation of new values for the cumulative variables L, Q and Q1 or the adoption of values present in adjacent range lane. The affirmative branch of this test indicates that processing is taking place in the middle of a target footprint, thus requiring the incrementing of the L, Q and Q1 arrays and the classification of the footprint as one of an individual or an extended target footprint.

Figure 10:
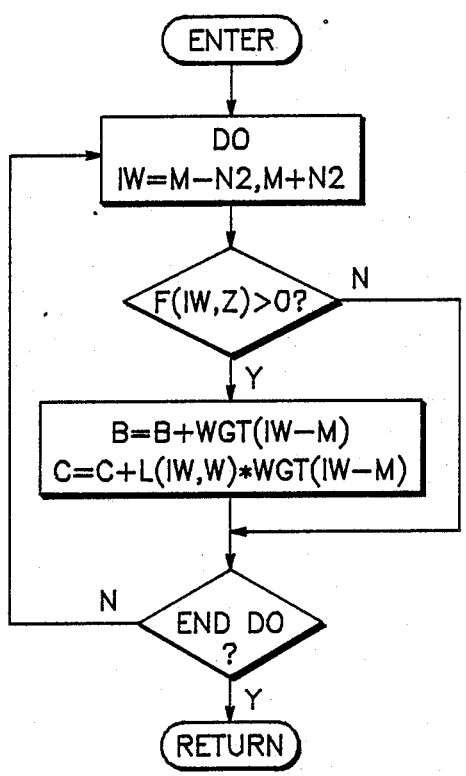
FIG. 10 is a flowchart describing a portion of the method of data reduction according to the principles of the present invention.

First, returning to the negative branch of the F(M,W) greater than zero test, the first step is to calculate values for two more intermediate products, B and C. The details of the calculation are shown in FIG. 10 and will be discussed below. The same process of investigating each data cell within the range window about M as was performed in calculating the previous intermediate products is carried out again. B is the sum of the weighting coefficients within the range window which are associated with non-zero values in the F array. C is the weighted sum of the values of the length accumulation variable L which are associated with non-zero values in the F array. Thus, the quotient C/B is a weighted average of the variable L within the range window.

Next, the initial values of the internal variables L, Q and Q1 are calculated using the intermediate products calculated above. L(M,Z) is set equal to C/B. Q(M,Z) is set equal to E/B. Q1(M,Z) is set equal to E1/D1.

Next, a logical test is performed to determine if the data cell currently being processed is the leading edge of a new target footprint or a continuation of a footprint existing in an adjacent range lane. Satisfactory performance of the algorithm is achieved by testing for non-zero values of B. If B is equal to zero, it is assumed that the current data cell represents the leading edge of a new target footprint. In this case the values just calculated for L, Q and Q1 are correct and the local processing routine is terminated. If B is non-zero, it is assumed that the current data cell is a part of a target footprint appearing in other range lanes, thus requiring the adoption of new values for Q and Q1. It is anticipated that a more discriminating test than simply non-zero values of B will be developed.

Two more intermediate products, A and A1, are calculated in the case of a non-zero B. A is the weighted sum of the values of Q in the preceeding track lane W which are associated with non-zero values of F. The summation used to calculate A is indexed by IW and is performed over the range −N2 to +N2. Therefore, in essence, this is the same process by which the previous intermediate products were calculated except that no explicit test for non-zero values in the F array is necessary since the value of Q is zero except where non-zero values of F exist. Similarly, A1 is the weighted sum of the values of Q1 in the preceeding track lane which are associated with positive values in the F array. Thus, the quotient A/B is the weighted average of the values of Q which were accumulated by the algorithm in the previous track lane within the range window about M. The quotient A1/B is the weighted average of the values of Q1 accumulated by the apparatus in the previous track lane within the range window. Therefore, the new value of Q(M,Z) is the old value plus A/B and the new value of Q1(M,Z) is the old value plus A1/B. After this adoption of new values, the local processing routine is terminated.

Returning to the test for non-zero values of F(M,W), the affirmative branch of that test is discussed. Recall that this branch is executed when processing a footprint which was present in the same range lane M in the previous track lane W. The first step is to increment the values of L, Q and Q1. The value for L in the current track lane is simply the value from the previous track lane plus one. Similarly, the value for Q in the current track lane is the value from the previous track lane plus E/D. The value for Q1 in the current track lane is the value from the previous track lane plus E1/D1.

Next, it must be determined whether the accumulated footprint length L(M,Z) has exceeded the upper limit for individual target footprints. A test for values of the current footprint length less than or equal to L2 +N1 performs this discrimination. Affirmative results of this test indicate that the apparatus is not yet dealing with an extended target footprint and the local processing routine can be terminated. Negative results of this test indicate that an extended target footprint is being processed which cannot be accurately represented by a single centroid. Therefore, the algorithm calculates a "centroid" for each resolution cell which is added to the target footprint in excess of L2. Thus, the negative branch of the test includes calculations of M5 and N5 which are identical to the calculations performed for individual target footprints. In addition, the value of V5 is set equal to zero since the radial velocity of extended target footprints cannot be readily calculated. The values of the output variables are next packed for transmission to the G-image.

Next, it is necessary to compensate for the "tail" on extended target footprints created by the use of the F array. A test for values of L(M,Z) less than L2+2 is performed. Affirmative results of this test indicate that the tail does not yet need to be "clipped" and the local processing routine is terminated. Negative results of this test indicate that the values of L, Q and Q1 must be altered. The value of L(M,Z) is decremented by one. The value of Q(M,Z) is decremented by M5. And the value of Q1(M,Z) is set equal to zero, since no footprint slopes need to be calculated for extended targets. Finally, the local processing routine is terminated.

Figure 9:
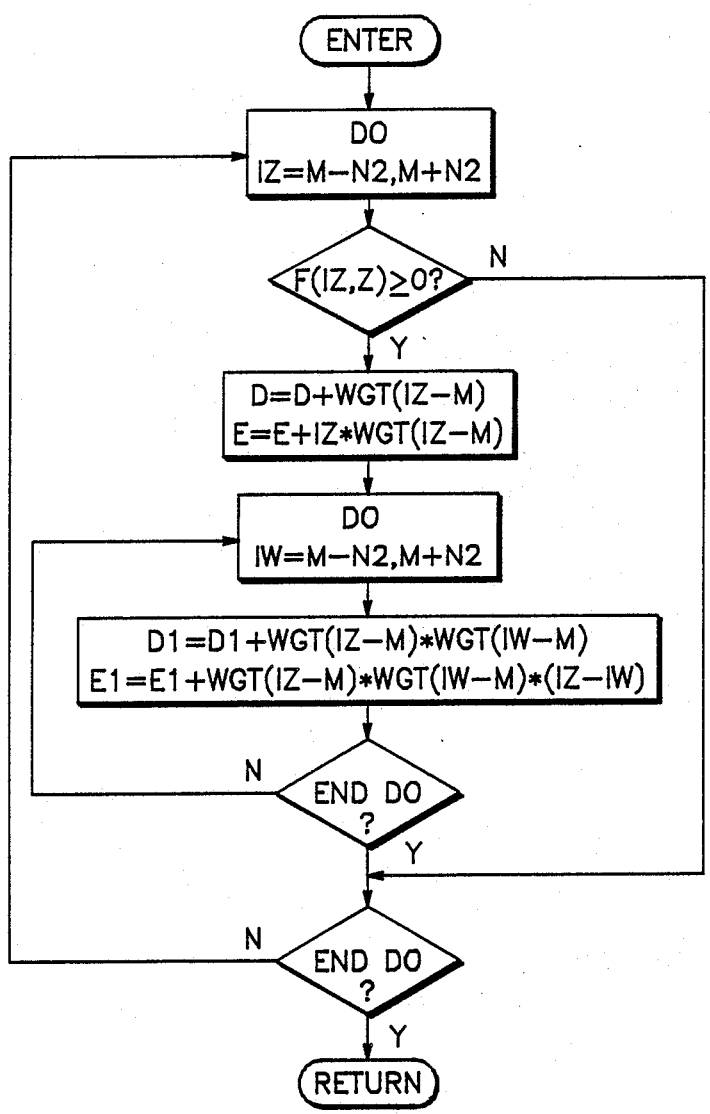
FIG. 9 is a flowchart describing a portion of the method of data reduction according to the principles of the present invention.

Before preceding to the descriptions of FIG. 9 and FIG. 10, is should be noted that in a real system implementing the apparatus described, compromises to allow real time operation of the apparatus may be necessary. For instance, in a Fortran implementation of the apparatus it has been found necessary to use integer arithmetic throughout to achieve a reasonable run time. In several instances this results in serious truncation errors which effect the performance of the algorithm. To avoid these errors the variables L and Q1 were prescaled. Since each implementation of the apparatus will be highly dependent upon the hardware chosen and the choice of a programming language, these details must be left to be worked out in each individual case.

Referring now to FIG. 9, the details of the calculation of the intermediate products D, D1, E and E1 are discussed. While this routine is shown here as a subroutine, in fact it is an integral part of the local processing routine and is separated herein only for clarity. A first loop with index with IZ, which increments from M−N2 to M+N2, controls the incrementing of the D and E summations. First, a test for non-zero values of F(IZ,Z) is performed. Negative results of this test indicate that no additions should be made to any of the intermediate variables, thus process control is jumped to the bottom of the first loop. Affirmative results of this test indicate that all four intermediate products should be incremented. The value of D is incremented by the amount WGT(IZ−M). The value of E is incremented by an amount IZ·WGT(IZ−M). Next, a second loop with index IW, which also increments from M−N2 to M+N2 controls the incrementing of D1 and E1. D1 is incremented by an amount WGT(IZ−M)·WGT(IW−M). E1 is incremented by an amount WGT(IZ−M)·WGT(IW−M)·(IZ−IW). When the second loop has completed its run over the range window the first loop is re-entered and processing takes place for the next value of IZ. When the first loop has completed its run over the range window the calculation is complete and the routine is terminated.

Referring now to FIG. 10, the details of the calculation of the intermediate products B and C are discussed. In this case a single loop with index IW, which increments from M−N2 to M+N2 is used to control the incrementing of B and C. Again, a test for non-zero values of F(IW,Z) is used to indicate whether the intermediate products should be incremented. Where non-zero values in the F array are indicated, B is incremented by an amount WGT(IW−M) and C is incremented by an amount L(IW,W) WGT(IW−M) once the loop has completed its run over the range window the calculation is complete and the routine is terminated.

Figure 12:
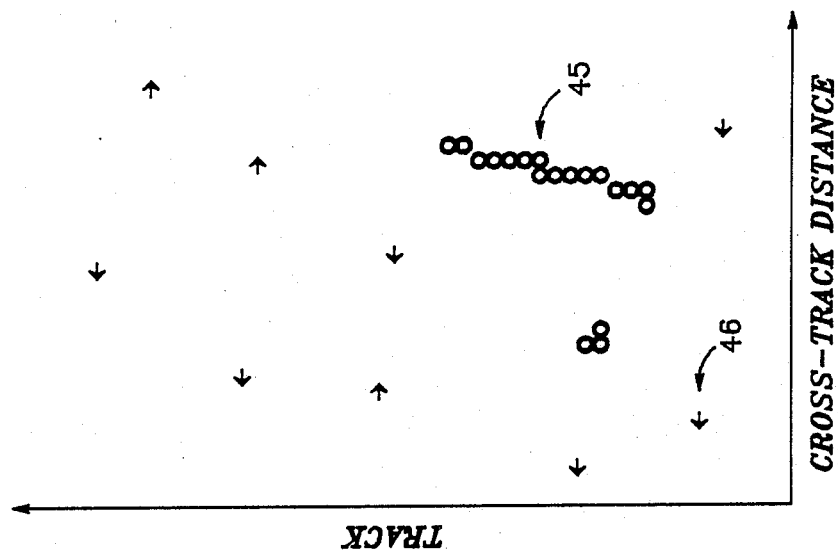
FIG. 12 is a graphic representation in plan view of the data of FIG. 11 after processing according to the principles of the present invention.
Figure 11:
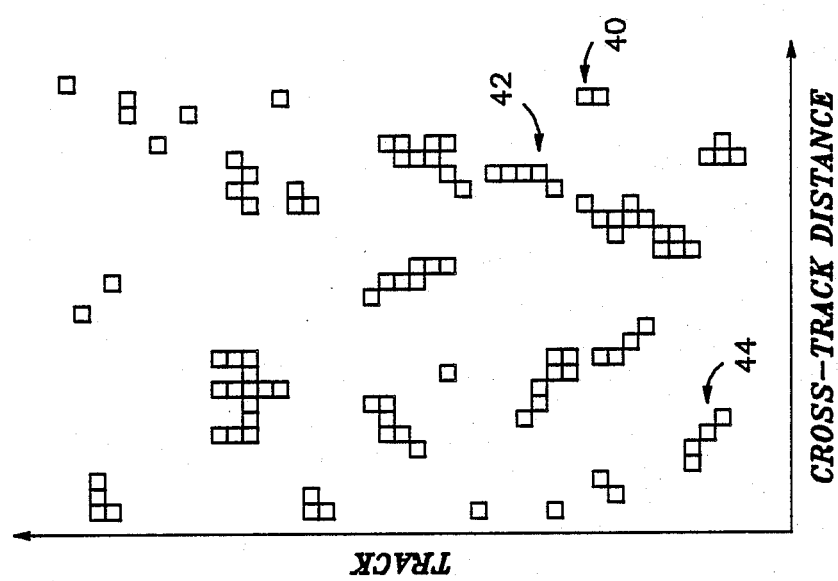
FIG. 11 is a graphic representation in plan view of rectified, digitized MT data prior to processing according to the principles of the present invention.

Referring now to FIGS. 11 and 12 an example of an H-image and a G-image are shown. The H-image shown in FIG. 11 is the digitized, rectified pulse return data appearing in the ground track-true range reference system. The boxes of FIG. 11 indicate data cells containing MT energy. The footprints include clutter 40, a fragmented, extended target 42, and numerous individual targets such as 44. In the G-image shown in FIG. 12, all footprints which are too short to represent valid targets are completely removed. The footprint corresponding to the fragmented, extended target 42 is represented in substantially truncated form 45 since only the "centroids" calculated by the local processing routine are now present. The individual targets such as 44 are now represented as arrows 46 which indicate the direction of motion of the target with respect to ground track. The G-image shown in FIG. 12 is only one of a very large number of ways in which the data produced by the apparatus can be displayed. In addition, the data is in a much more compact form than the H-image, thus making it more suitable for digital data transmission and storage. It is anticipated that the overall processing method according to the principles of the present invention may result in a bandwidth reduction from the raw radar video data to the final G-image of a factor of several thousand. It is anticipated that the resulting processed data will be suitable for transmission over audio bandwidth channels.

While the invention has been particularly shown and described with reference to a preferred embodiment thereof, it will be understood by those skilled in the art that various other modifications and changes may be made to the present invention from the principles of the invention described without departing from the spirit and scope thereof.

We claim:

1. In a side-looking airborne radar a method of data reduction comprising the steps of:
    receiving analog pulse return data;
    substantially separating moving target and fixed target portions of said analog pulse return data;
    integrating said moving target data over a predetermined distance in an azimuth direction;
    integrating said moving target data over a predetermined distance in a range direction;
    thresholding said moving target data to produce a digital word at least one bit long corresponding to each range-azimuth cell;
    applying a slant range to ground range correction to said moving target data;
    applying a crab angle correction to said moving target data;
    replacing at least some target footprints in said moving target data with representations of the centroids thereof and the motion of said centroids;
    replacing at least some target footprints in said moving target data with truncated versions thereof; and
    rejecting the remainder of said moving target data.

2. A method of data reduction according to claim 1 wherein the step of applying a crab angle correction comprises the step of:
    applying a ground range to true range correction to said moving target data.

3. A method of data reduction according to claim 1 wherein the step of replacing at least some target footprints in said moving target data with representations of the centroids thereof and the motion of said centroids further comprises the steps of:
    identifying all potential targets in a current track lane of said moving target data;
    calculating a current length of each potential target;
    calculating a current range of each potential target;
    identifying potential targets ending in a previous track lane of said moving target data;
    selecting a first group of targets having lengths within a predetermined range of lengths;
    calculating a track dimension centroid of each of said first selected targets;
    calculating a range dimension centroid of each of said first selected targets;
    replacing the footprints of each of said first group of selected targets with a digital word at a location corresponding to the target centroid, said digital word characterizing a type and a motion of said selected target.

4. A method of data reduction according to claim 3 further comprising the steps of:
    calculating a footprint slope for each of said selected targets;
    calculating an approximate radial velocity for each of said selected targets from said footprint slope; and
    correcting said approximate radial velocity by removing an apparent radial velocity due to a crab angle.

5. A method of data reduction according to claim 3 further comprising the steps of:
    selecting a second group of targets having lengths greater than said predetermined range of lengths; and
    replacing the footprints of each of said second group of selected targets with truncated versions thereof.

6. A method of data reduction according to claim 3 wherein the step of rejecting the remainder of said moving target data comprises the step of:

removing all target footprints having lengths less than said predetermined range of lengths.

7. A method of data reduction according to claim 3 wherein said predetermined range of lengths is a function of target range.

8. In a side-looking airborne radar of the real aperture type a method of processing and displaying moving target data comprising the steps of:

generating a first image comprising moving target data, said moving target data having been converted to a ground track-true range reference system and having been digitized;

identifying data cells in a current track lane of said first image containing moving target return energy;

determining, with respect to each said identified data cell, whether said cell represents a new target footprint or a continuation of a previous target footprint;

accumulating, for each target footprint, length and range information;

identifying each target footprint ending in a previous track lane of said first image;

classifying each said ended target footprint as corresponding to one of clutter, an individual target and an extended target; and generating a second image comprising truncated versions of target footprints corresponding to extended targets and centroids of target footprints corresponding to individual targets.

9. A method according to claim 8 further comprising the steps of:

calculating a radial velocity of each of said individual targets; and incorporating said radial velocities into said second image.

10. A method according to claim 9 wherein the step of calculating a radial velocity further comprises the steps of:

calculating a footprint slope of each of said individual target footprints;

calculating an approximate radial velocity of each of said individual targets from said footprint slopes; and correcting said approximate radial velocity by removing an apparent radial velocity due to a crab angle.

11. A method according to claim 8 wherein the step of determining, with respect to each said identified data cell, whether said cell represents a new target footprint or a continuation of a previous target footprint further comprises the steps of:

determining whether a data cell in the same range lane as said identified cell and in the previous track lane was identified as containing moving target return energy; and if not, searching said previous track lane for a predetermined number of range lanes around said identified cell for data cells containing moving target return energy.

12. A method of operating a side-looking, real aperture airborne radar comprising the steps of:

flying an aircraft at a known altitude and airspeed over a known ground track at a known crab angle;

emitting from a real aperture antenna mounted on said aircraft a pulsed radar beam;

receiving pulse return energy from objects illuminated by said beam;

forming a first image from said pulse return energy, said first image comprising a plurality of digital data words each indicating an intensity of moving target return energy in a data cell;

identifying those data cells in a most recently completed track lane of said first image having a digital data word value greater than a predetermined threshold;

determining whether each said identified data cell is new target footprint or a continuation of a previous target footprint;

accumulating length and range information on each target footprint;

identifying each target footprint ending in a previous track lane of said first image; and forming a second image comprising a plurality of digital data words, said second image containing substantially truncated versions of at least some of said target footprints.

13. A method according to claim 12 wherein the step of forming a first image further comprises the steps of:

integrating said pulse return energy for a first predetermined length of time;

integrating said pulse return energy for a second predetermined length of time;

thresholding said pulse return energy to produce a digital data word at least one bit long corresponding to each data cell defined by said integration steps;

applying a slant range to ground range correction to said digitized data; and applying a crab angle correction to said digitized data.

14. A method according to claim 12 wherein the step of determining whether each said identified data cell is a new target footprint or a continuation of a previous target footprint further comprises the step of:

adding one to a register for each track lane occupied by a target footprint up to a maximum value;

subtracting one from said register for each track lane skipped by said footprint; and allocating an identified resolution cell at the same range as said footprint to said footprint if said register is currently greater than zero.

15. A method according to claim 12 wherein said step of forming a second image comprises the steps of:

classifying each of said ended targets as one of clutter, an individual target and an extended target;

calculating range and length centroids of said individual targets; locations corresponding to each of said centroids equal to predetermined values; and setting digital data words of said second image at locations corresponding to truncated versions of said extended targets equal to a predetermined value.

16. A method according to claim 15 further comprising the steps of:

calculating a radial velocity for each of said individual targets; and altering said predetermined values of said digital data words corresponding to the centroids of said individual targets to reflect the radial velocity thereof.

* * * * *

UNITED STATES PATENT AND TRADEMARK OFFICE
CERTIFICATE OF CORRECTION

PATENT NO. : 4,894,658

DATED : January 16, 1990

INVENTOR(S) : Robert Hecht-Nielsen et al.

It is certified that error appears in the above-identified patent and that said Letters Patent is hereby corrected as shown below:

In column 18, claim 15, line 54, before the word "locations" insert this phrase beginning a new paragraph --setting digital data words of said second image at--.

Signed and Sealed this

Thirtieth Day of July, 1991

Attest:

HARRY F. MANBECK, JR.

*Attesting Officer*   Commissioner of Patents and Trademarks